United States Patent
Castillo et al.

(10) Patent No.: US 9,033,205 B2
(45) Date of Patent: May 19, 2015

(54) FRICTION STIR WELDING WITH TEMPERATURE CONTROL

(76) Inventors: Alfredo Castillo, San Jose, CA (US); Umakaran Nemallan, Cupertino, CA (US)

( * ) Notice: Subject to any disclaimer, the term of this patent is extended or adjusted under 35 U.S.C. 154(b) by 0 days.

(21) Appl. No.: 13/560,937

(22) Filed: Jul. 27, 2012

(65) Prior Publication Data
US 2014/0027496 A1    Jan. 30, 2014

(51) Int. Cl.
*B23K 20/00* (2006.01)
*B23K 20/12* (2006.01)
*B23K 37/00* (2006.01)

(52) U.S. Cl.
CPC ............ *B23K 20/127* (2013.01); *B23K 20/124* (2013.01)

(58) Field of Classification Search
CPC .. B29C 66/91; B29C 66/912; B29C 66/9121; B29C 66/914; B23K 20/123; B23K 20/1235; B23K 20/124; B23K 20/127; B23K 20/122; B23K 20/1225; B23K 20/126
USPC ................................. 228/112.1, 113, 114, 2.1
See application file for complete search history.

(56) References Cited

U.S. PATENT DOCUMENTS

| 6,247,633 | B1 | 6/2001 | White et al. | |
| 6,913,186 | B2 | 7/2005 | Vyas | |
| 7,150,389 | B1 | 12/2006 | Knipstrom et al. | |
| 8,061,579 | B2 | 11/2011 | Feng et al. | |
| 2004/0050906 | A1 | 3/2004 | Rice et al. | |
| 2005/0001009 | A1 | 1/2005 | Raether et al. | |
| 2008/0099533 | A1* | 5/2008 | Hanlon et al. | 228/112.1 |
| 2009/0236403 | A1 | 9/2009 | Feng et al. | |
| 2009/0261146 | A1 | 10/2009 | Hou et al. | |
| 2010/0176182 | A1* | 7/2010 | Hanlon et al. | 228/2.1 |
| 2012/0298304 | A1* | 11/2012 | Kato | 156/350 |

FOREIGN PATENT DOCUMENTS

| CN | 102049607 | 5/2011 |
| JP | 4277247 | 6/2009 |

OTHER PUBLICATIONS

Interview proposed amendments from Applicant.*
www.bondhus.com/metallurgy/body-3.htm Bondhus, 2009.*

* cited by examiner

*Primary Examiner* — Erin Saad
(74) *Attorney, Agent, or Firm* — Womble Carlyle Sandridge & Rice, LLP (57) ABSTRACT

A method for friction stir welding is provided. The method may include determining the temperature of one or both parts being welded. The parts may then be heated to a desired temperature and then friction stir welded together. By preheating the parts, the friction required to plasticize the parts during welding may be reduced. Thereby, the rotational speed of the friction stir welding tool may be reduced, and thus the tool life may be extended without decreasing the rate at which welds are created. Additionally, the cooling rate of the weld may be regulated with a thermal control device.

7 Claims, 5 Drawing Sheets

FIG. 5 ns # FRICTION STIR WELDING WITH TEMPERATURE CONTROL

TECHNICAL FIELD

The present disclosure relates generally to friction stir welding, and more particularly to methods and apparatuses for improving the quality of welds produced by friction stir welding and improving tool longevity.

BACKGROUND

Various types of methods and apparatuses have been developed for joining two parts. Example embodiments of methods for joining two parts include adhesive bonding, welding, use of fasteners, etc. In the context of joining certain materials, such as metals, welding has been identified as a suitable method presently in use today.

Various forms of welding methods exist. Example embodiments of welding methods include laser welding, arc welding, gas welding, and friction stir welding. Friction stir welding may present certain advantages over other forms of welding. For example, friction stir welding may not involve heating the parts being welded to as great of an extent as other forms of welding. Further, friction stir welding may not require use of flux or gases which could introduce contaminants into the weld. However, the formation of suitably strong and aesthetically appealing welds using friction stir welding may present certain challenges.

Accordingly, apparatuses and methods for improved friction stir welding are provided.

SUMMARY

A method for friction stir welding is provided. The method may include determining the temperature of one or more parts being welded. The parts may be preheated to increase the temperature thereof to a desired temperature. The preheated parts may be friction stir welded together along a joint therebetween.

The parts may be preheated at the same time the parts are friction stir welded together. For example, a preheating device may be directed along the joint in advance of the rotating friction stir welding tool at a fixed distance therefrom. The first part and the second part may be selectively heated at the joint, rather than the entirety thereof, in order to avoid wasting energy.

In some embodiments the method may also include regulating a cooling rate of the weld. A temperature differential between a position proximate the friction stir welding tool and behind the friction stir welding tool at the weld produced thereby may be determined. The weld may then be heated or cooled depending on whether the temperature differential is greater or less than a desired temperature differential. Accordingly, the cooling rate of the weld may be controlled to result in a desired grain size. The cooling rate may be selectively varied along the length of the weld to provide the weld with varying characteristics along the length thereof.

A system for friction stir welding is also provided. The system may include a friction stir welding tool, an actuator configured to move the friction stir welding tool relative to the parts being welded, and a thermal control device. The thermal control device may include a preheating device configured to preheat the parts. In this regard, the thermal control device may include a temperature sensor, a heating element, and a controller configured to instruct the heating element to heat the parts until the temperature of the parts reaches a desired temperature. The heating element and the temperature sensor may be mounted in front of the friction stir welding tool and configured to extend into the joint between the parts being welded.

The thermal control device may also include a cooling regulating device configured to control a cooling rate of the weld produced by the friction stir welding tool. In this regard, the thermal control device may include first and second sensors configured to determine a temperature differential and a heating element and a cooling element respectively configured to heat and cool the parts, depending on whether the temperature differential is too high or low. In some embodiments the cooling rate may be varied along the length of the weld to provide the weld with varying characteristics along the length thereof.

A non-transitory computer readable medium for storing instructions configured to control a friction stir welding system is also provided.

Other apparatuses, methods, features and advantages of the disclosure will be or will become apparent to one with skill in the art upon examination of the following figures and detailed description. It is intended that all such additional systems, methods, features and advantages be included within this description, be within the scope of the disclosure, and be protected by the accompanying claims.

BRIEF DESCRIPTION OF THE DRAWINGS

The included drawings are for illustrative purposes and serve only to provide examples of possible structures and arrangements for the disclosed assemblies, methods, and systems. These drawings in no way limit any changes in form and detail that may be made to the disclosure by one skilled in the art without departing from the spirit and scope of the disclosure.

DETAILED DESCRIPTION

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details. In other instances, well known process steps have not been described in detail in order to avoid unnecessarily obscuring the present disclosure. Other applications are possible, such that the following examples should not be taken as limiting.

Friction stir welding is a method for joining two parts which may present certain advantages over other forms of welding. For example, friction stir welding may not heat the parts being welded to as great of an extent as other forms of welding. In this regard, certain materials may not be able to withstand temperatures associated with other forms of welding. Further, subjecting the parts to high heat may cause the parts to warp. Stresses may also build at the joint as a result of the heat that may eventually lead to failure of the weld.

Additionally, friction stir welding be advantageous in that it may not require use of flux or gases which could introduce contaminants into the weld. Introduction of contaminants into the weld may affect other operations later performed on the parts. For example, it may be more difficult to anodize the parts when contaminants have been introduced into the weld.

Friction-stir welding is a solid-state joining process (meaning the metal is not melted) and may be used in applications where the original metal characteristics must remain unchanged as far as possible. Friction stir welding functions by mechanically intermixing the two pieces of metal at the place of the joint, transforming them into a softened state that allows the metal to be fused using mechanical pressure. This process is primarily used on aluminum, although other materials may be welded, and is most often used on large pieces which cannot be easily heat treated post weld to recover temper characteristics.

Figure 1:
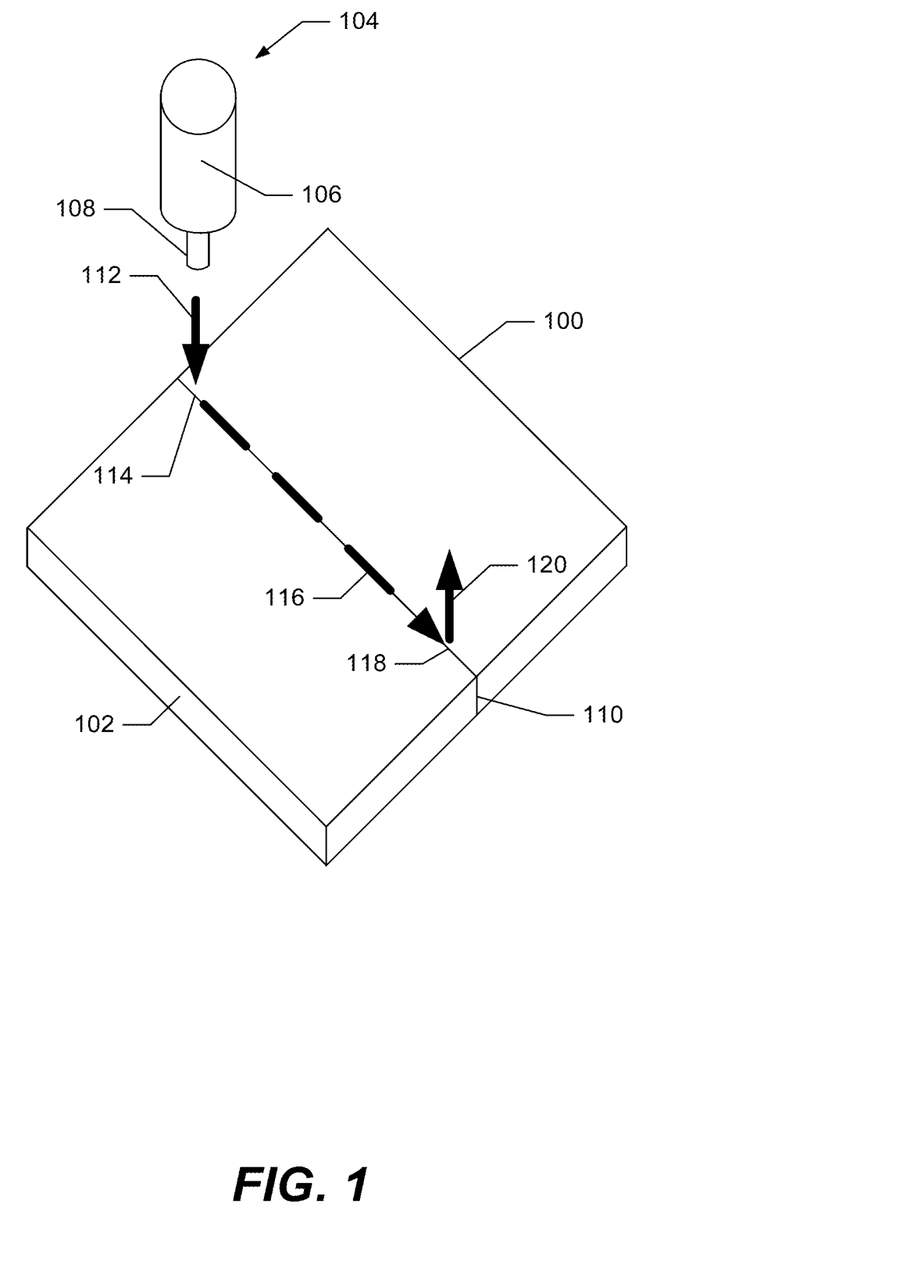
FIG. 1 illustrates a perspective view of operations performed in friction stir welding.

FIG. 1 schematically illustrates an example embodiment of the friction stir welding process. As illustrated, a first part 100 can be joined to a second part 102 via friction stir welding using a constantly rotated friction stir welding tool 104 including a shoe 106 and a pin 108 extending therefrom. In order to weld the first part 100 and the second part 102 together along a joint 110 therebetween, the friction stir welding tool 104 may initially be inserted into the joint, for example, by directing the tool downwardly along a path 112 at a starting point 114. The tool 104 may then be transversely fed along a path 116 along the joint 110 between the first part 100 and the second part 102, which may be clamped together. The pin 108 may be slightly shorter than the weld depth required, with the shoe 106 riding atop the work surface.

Frictional heat is generated between the wear-resistant welding components defining the friction stir welding tool 104 and the parts 100, 102 being welded. This heat, along with that generated by the mechanical mixing process and the adiabatic heat within the material, cause the stirred materials to soften without melting. As the pin 108 is moved forward along the path 116 the plasticized material moves to the rear where clamping force assists in a forged consolidation of the weld. This process of the friction stir welding tool 104 traversing along the weld line in a plasticized tubular shaft of material may result in severe solid state deformation involving dynamic recrystallization of the base material. After traversing the path 116 at the joint 110, the friction stir welding tool 104 may be lifted from the material at an end point 118 upwardly along a path 120. Accordingly, a weld may be created along the joint 110 between the starting point 114 and the end point 118.

However, the formation of a weld via friction stir welding with desirable strength and cosmetic properties may present certain issues. In this regard, since friction stir welding relies on the creation of frictional heat, a stronger weld will generally be produced by relatively larger rotational speeds of the friction stir welding tool and lower transverse speeds of the friction stir welding tool across the parts being welded. However, higher rotational speeds of the friction stir welding tool may increase the wear rate thereof. Further, lower transverse speeds of the friction stir welding tool along the joint decrease the rate at which welds may be produced.

Additionally, the strength and cosmetic appearance of a weld created by friction stir welding may depend upon the rate at which the material at the weld cools. Further, a weld including smaller grains may be more cosmetically appealing and more easily anodized. Accordingly, embodiments of the disclosure are configured to improve the quality of welds produced by friction stir welding, for example by improving the strength and/or appearance thereof, and improving tool longevity.

Figure 2:
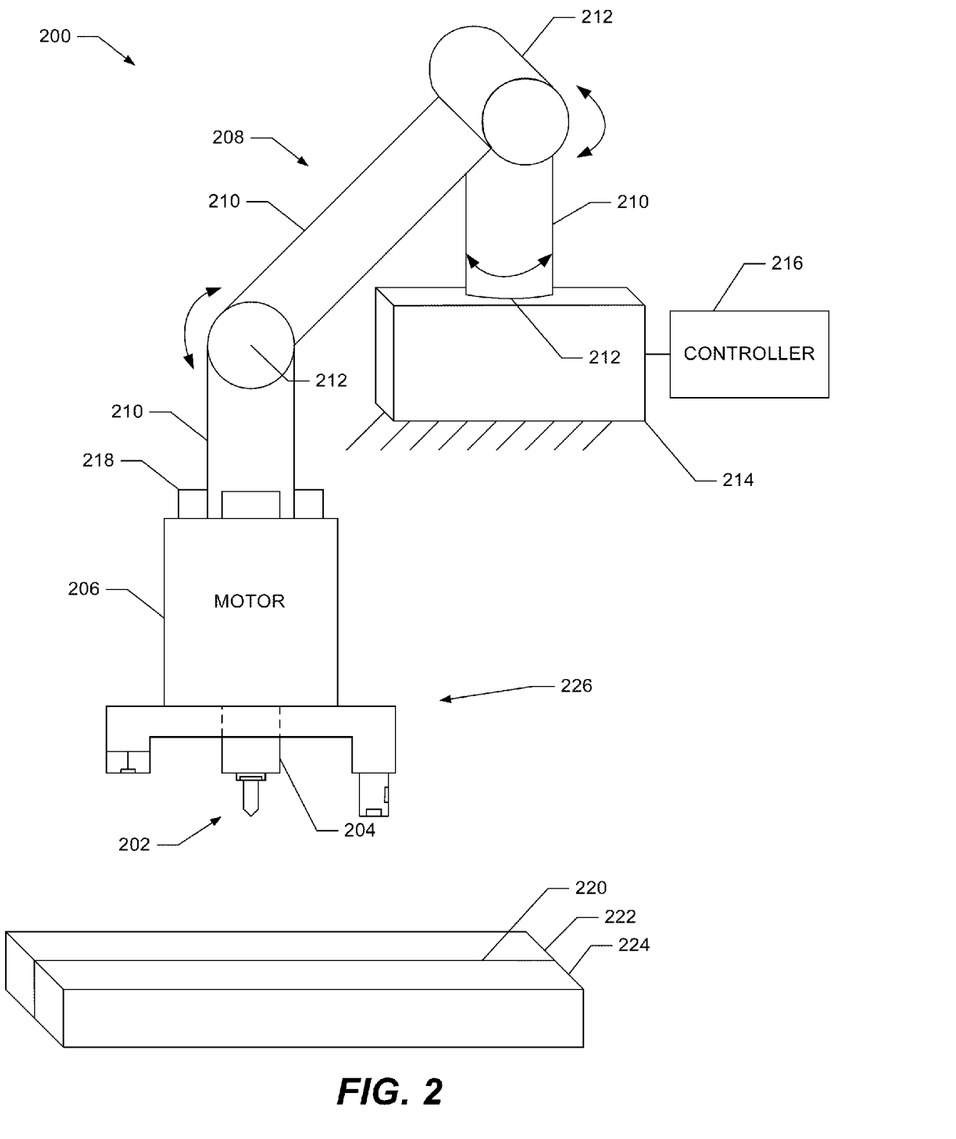
FIG. 2 illustrates a schematic view of a system for friction stir welding comprising a thermal control device and a friction stir welding tool according to an example embodiment of the present disclosure.

In this regard, FIG. 2 illustrates a friction stir welding system 200 according to an embodiment of the present disclosure. The friction stir welding system 200 may include a tool 202, which may be mounted to a spindle 204 that is rotated by a motor 206. The position of the motor 206, spindle 204, and tool 202 may be controlled by an actuator 208.

In the illustrated embodiment, the actuator 208 comprises a robotic assembly. As illustrated, the robotic assembly may include one or more arms 210, one or more joints 212, and a base 214. Thus, the arms 210 may be rotated about the joints 212 to position the tool 202 at an appropriate position to friction stir weld. However, various other embodiments of actuators (e.g., gantry systems) may be employed to control the position of the tool 202 relative to the parts being welded. Regardless of the particular embodiment of actuator employed, the friction stir welding system 200 may further comprise a controller 216. The controller 216 may be configured to control the actuator 208, the motor 206, and/or other portions of the friction stir welding system 200.

In some embodiments the friction stir welding system 200 may further comprise one or more load cells 218. The load cells 218 may be configured to detect load applied to the friction stir welding system 200. For example, during operation of the friction stir welding system 200, the tool 202 may tend to veer off course from the joint between the two parts being welded as a result of torque applied to the tool. Accordingly, the load cells 218, which may be equally distributed around the motor 206 and/or one of the arms 210 of the robotic assembly, may detect the load applied by the torque and the controller 216 may instruct the actuator 208 to compensate therefor to prevent the tool 202 from veering away from the joint. Thus, a weld that closely follows a joint 220 between a first part 222 and a second part 224 may be formed. Note that in some embodiments a fixture, which is not shown for clarity purposes, may be employed to hold the parts 222, 224 in position and/or compress the parts against one-another during friction stir welding.

As further illustrated in FIG. 2, the system 200 may additionally include a thermal control device 226. The thermal control device 226 may be mounted to the motor 206 or otherwise placed in relatively close proximity to the friction stir welding tool 202 in some embodiments. By mounting the thermal control device 226 proximate to the friction stir welding tool 202 (e.g., at a fixed distance therefrom), the thermal control device may travel with the friction stir welding tool as it moves along the joint 220 between the parts 222, 224.

Figure 3:
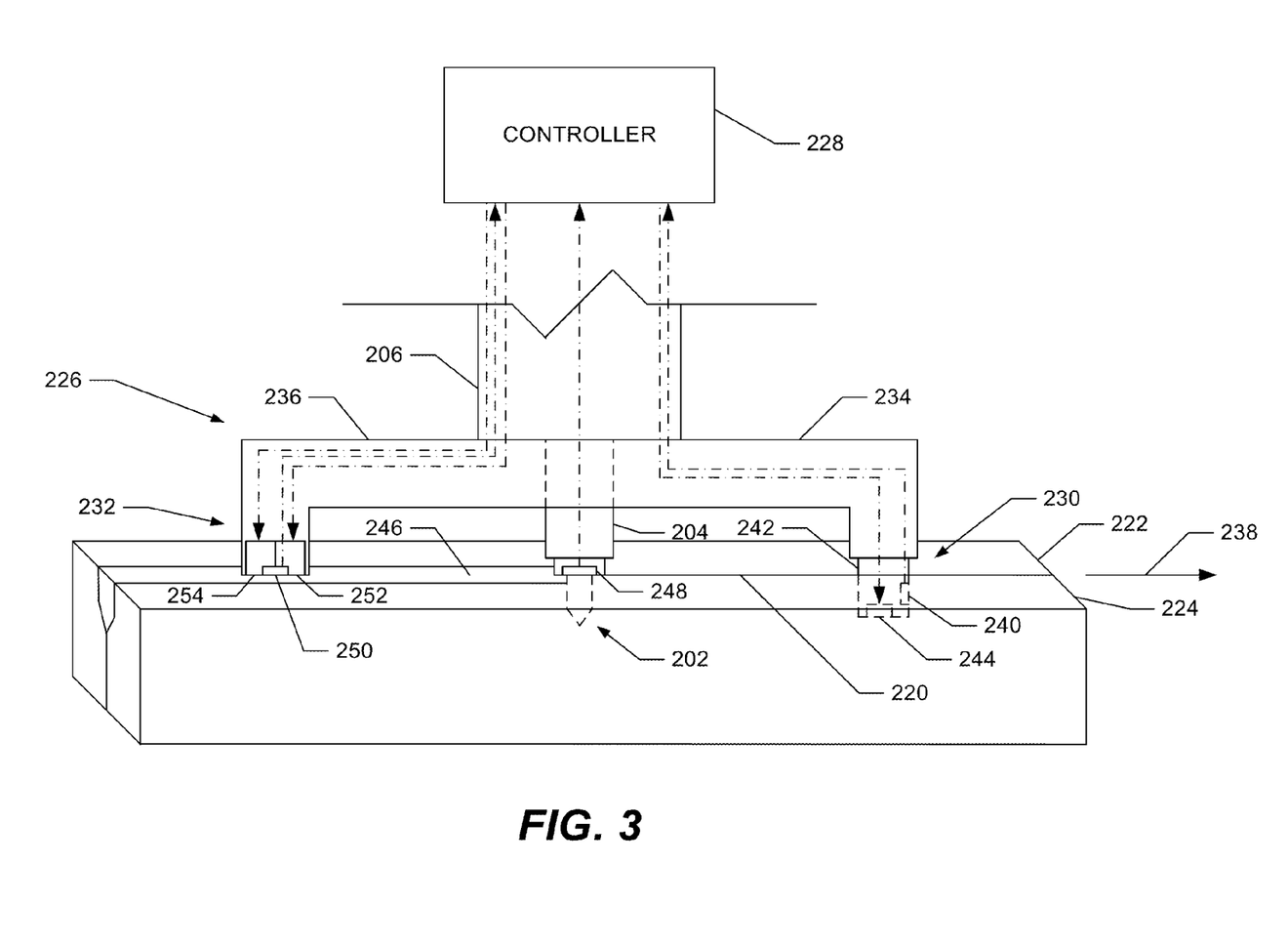
FIG. 3 illustrates an enlarged partial view of the thermal control device and the friction stir welding tool of FIG. 2.

FIG. 3 illustrates an enlarged partial view of the system 200, including the tool 202, the spindle 204, the motor 206, and the thermal control device 226, during a friction stir welding operation. FIG. 3 further illustrates a controller 228 for the thermal control device 226. In some embodiments the controller 228 for the thermal control device 226 may be embodied in or as the controller 216 for the friction stir welding system 200.

As illustrated, in some embodiments the thermal control device 226 may include a preheating device 230 and a cooling regulating device 232. In some embodiments the preheating device 230 and the cooling regulating device 232 may be at least partially mounted on respective front and rear arms 234, 236. By mounting the preheating device 230 in front of the friction stir welding tool 202 (in terms of a welding direction 238), the preheating device 230 may precede the friction stir welding tool as it traverses a welding path. Conversely, by mounting the cooling regulating device 232 behind the friction stir welding tool 202 (in terms of the welding direction 238), the cooling regulating device may follow the friction stir welding tool as it traverses a welding path. In some embodiments the position of the preheating device 230 and/or the cooling regulating device 232 may be actively or passively adjustable as the friction stir welding tool traverses a welding path such that they may closely follow the joint despite curves or three-dimensional contours defined by the parts being welded. For example, the preheating device 230 and/or the cooling regulating device 232 may rotate and/or move up and down in order to follow curves and/or contours of the joint 220 between the parts 222, 224.

In terms of the functions of the thermal control device 226, the preheating device 230 may be configured to preheat the first part 222 and the second part 224. In this regard, a sensor 240 may be configured to determine a temperature of at least one of the first part 222 and the second part 224. The sensor 240 may comprise a thermocouple or other embodiment of a sensor configured to determine temperature. As illustrated, the sensor 240 may be mounted to the front arm 234. More particularly, the sensor 240 may be coupled to an extension 242. The extension 242 may be configured to position the sensor 240 proximate the joint 220. For example, the extension 242 may position the sensor 240 above the joint 220 or within the joint and between the first and second parts 222, 224, as illustrated.

The preheating device 230 may further comprise a heating element 244 configured to preheat the first part 222 and the second part 224. The heating element 244 may comprise any embodiment of a heater, such as a resistive, inductive, or laser heater. The heating element 244 may be configured to selectively preheat the first part 222 and the second part 224 at the joint 220, as opposed to preheating the entire first part and the entire second part in some embodiments. In this regard, preheating the entire first part 222 and/or the entire second part 224 may waste energy without providing any additional benefit. However, in other embodiments the heating element 244 may be configured to preheat a larger portion or substantially all of the first part 222 and the second part 224.

As illustrated, the heating element 244 may be mounted to the front arm 234. More particularly, the heating element 244 may be coupled to the extension 242. The extension 242 may be configured to position the heating element 244 proximate the joint 220. For example, the extension 242 may position the heating element 244 above the joint 220 or such that the heating element extends into the joint, as illustrated. Thereby the heating element 244 may heat the inner surfaces of the first part 222 and the second part 224 at the joint 220 without wasting heat on other portions of the first part and the second part. Note that the sensor 240 may be insulated from the heating element 244 such that the sensor is able to determine the temperature of the first part 222 and the second part 224 without detecting the temperature of the heating element 244 itself. Alternatively, or additionally, the controller 228 may compensate for the change in the detected temperature caused by the heating element 244, which may be empirically determined in some embodiments.

The controller 228 may be configured to instruct the heating element 244 to preheat the first part 222 and the second part 224 until the temperature reaches a desired temperature. For example, the controller 228 may be configured to preheat the first part 222 and the second part 224 while directing the rotating friction stir welding tool 202 along the joint 220 between the first part 222 and the second part 224. In this regard, as a result of positioning the heating element 244 in front of the friction stir welding tool 202 (in terms of the welding direction 238), the first part 222 and the second part 224 may be heated at the joint 220 in advance of the friction stir welding tool reaching these portions of the joint. The required amount of heat output required by the heating element 244 to reach a desired temperature based on an initial determined starting temperature may be empirically determined in some embodiments.

By preheating the first part 222 and the second part 224, the required heat produced by friction through rotation the friction stir welding tool 202 may be reduced. In this regard, since the preheated first and second parts 222, 224 require less additional heat to reach a plasticized state that allows for intermixing of the materials defining the first and second parts, the friction stir welding tool 202 may rotate at a lower speed. Accordingly, the life of the friction stir welding tool 202 may be prolonged. Further, since the first and second parts 222, 224 may more easily intermix as a result of the preheating thereof, the speed at which the friction stir welding tool 202 traverses the joint may not need to be reduced, or may be increased. Note that since the material intermixing occurs only at the joint 220 and portions of the parts 222, 224 immediately surrounding the joint, preheating the parts at the joint, as opposed to the entirety of the parts, may save time and energy.

As a result of the friction stir welding tool 202 rotating at the joint 220 between the parts 222, 224, a weld 246 may be produced. However, the strength and cosmetic appearance of the weld may depend upon the cooling rate thereof. Accordingly, the cooling regulating device 232 may regulate a cooling rate of the weld 246. The cooling regulating device 232 may comprise a plurality of sensors configured to determine a temperature differential between a temperature at the weld 246 and a temperature at the friction stir welding tool 202. For example, in the illustrated embodiment a sensor 248 is positioned proximate the friction stir welding tool 202 (e.g., inside the spindle 204). Further, a sensor 250 is mounted to the rear arm 236.

The controller 228 can compare the signal from the sensor 248 at the friction stir welding tool 202 and the signal from the sensor 250 mounted behind the friction stir welding tool at the weld 246 to determine a temperature differential between the locations at which the sensors are positioned. Thereby, the cooling rate of the weld 246 may be determined. Accordingly, the controller 228 may respond to the determined temperature differential by actively controlling the cooling rate of the weld 246.

For example, a second heating element 252 may be configured to heat the weld 246 when the temperature differential is greater than a desired temperature differential, as determined and directed by the controller 228. The second heating element 252 may comprise any embodiment of a heater, such as a resistive, inductive, or laser heater. Conversely, a cooling element 254 may be configured to cool the weld 246 when the temperature differential is less than a desired temperature differential, as determined and directed by the controller 228. The cooling element 254 may comprise any embodiment of a cooler, such as a nozzle for releasing compressed gas, or a coil coupled to a refrigerating circuit. Note that the sensor 248 may be insulated from the cooling element 254 and the second heating element 252 such that the sensor is able to determine the temperature of the weld 246 without detecting the temperature of the cooling element or the second heating element itself. Alternatively, or additionally, the controller 228 may compensate for the change in the detected temperature caused by the cooling element 254 and the second heating element 252, which may be empirically determined in some embodiments.

As noted above, a slower cooling rate may generally be desirable to form smaller grains in the weld 246 with relatively higher strength and improved cosmetic appearance. Thus, the second heating element 252 may generally be employed to heat the weld 246. Thereby, for example, the second heating element 252 may heat the weld 246 such that a constant cooling rate is defined along the length of the weld and thereby, the weld may define substantially constant strength therealong.

However, the cooling element 254 may be employed in certain circumstances. For example, the controller 228 may be configured to selectively vary the cooling rate along a length of the weld 246. In this regard, in some instances it may be desirable to cool the weld 246 at certain locations to define a substantially constant cooling rate, as noted above. However, in another embodiment it may be desirable to form a weld having varying characteristics therealong. For example, welds including relatively shorter grain sizes may define a different cosmetic appearance than welds including relatively larger grain sizes, particularly after anodizing the weld. Further, it may be desirable to vary the cooling rate along the length of a weld to produce a weld defining differing strength characteristics along the length thereof (e.g., differing hardness or tensile strength). Thereby, for example, a weld may be configured to fail in a controlled manner at one or more selected locations, in one embodiment. Use of the second heating element 252 and/or the cooling element 254 may assist in creating this varying cooling rate along the length of the weld 246.

Figure 4:
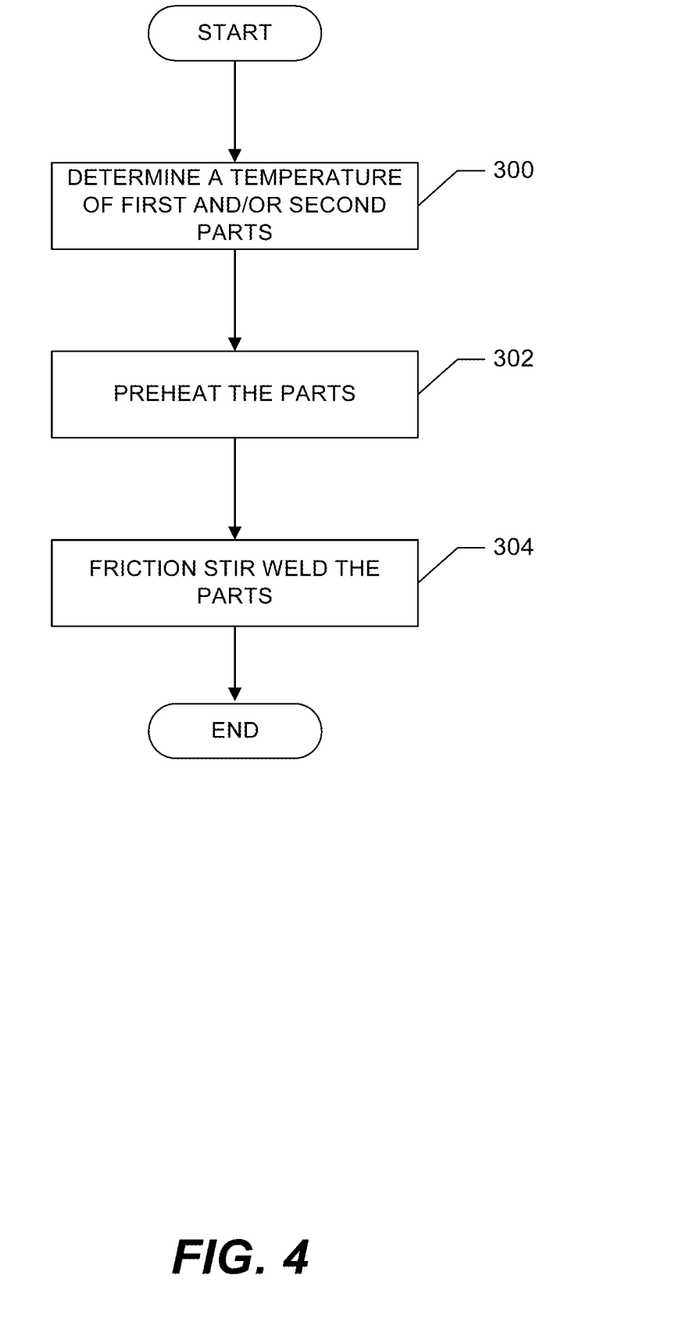
FIG. 4 illustrates a method for friction stir welding according to an example embodiment of the present disclosure.

A related friction stir welding method is also provided. As illustrated in FIG. 4, the method may include determining a temperature of at least one of a first part and a second part at operation 300. Further, the method may include preheating the first part and the second part to increase the temperature to a desired temperature at operation 302. The method may additionally include directing a rotating friction stir welding tool along a joint between the first part and the second part to form a weld therebetween at operation 304.

In some embodiments preheating the first part and the second part at operation 302 may be conducted while directing the rotating friction stir welding tool along the joint between the first part and the second part at operation 304. For example, preheating the first part and the second part at operation 302 may comprise directing a preheating device along the joint in advance of the rotating friction stir welding tool. Further, preheating the first part and the second part at operation 302 may comprise selectively preheating the first part and the second part at the joint.

In some embodiments the method may also include regulating a cooling rate of the weld. Regulating the cooling rate of the weld may comprise selectively varying the cooling rate along a length of the weld. Regulating the cooling rate of the weld may comprise determining a temperature differential between a temperature at the weld and a temperature at the rotating friction stir welding tool. Regulating the cooling rate of the weld may further comprise heating the weld when the temperature differential is greater than a desired temperature differential. Additionally, regulating the cooling rate of the weld may further comprise cooling the weld when the temperature differential is less than a desired temperature differential.

Figure 5:
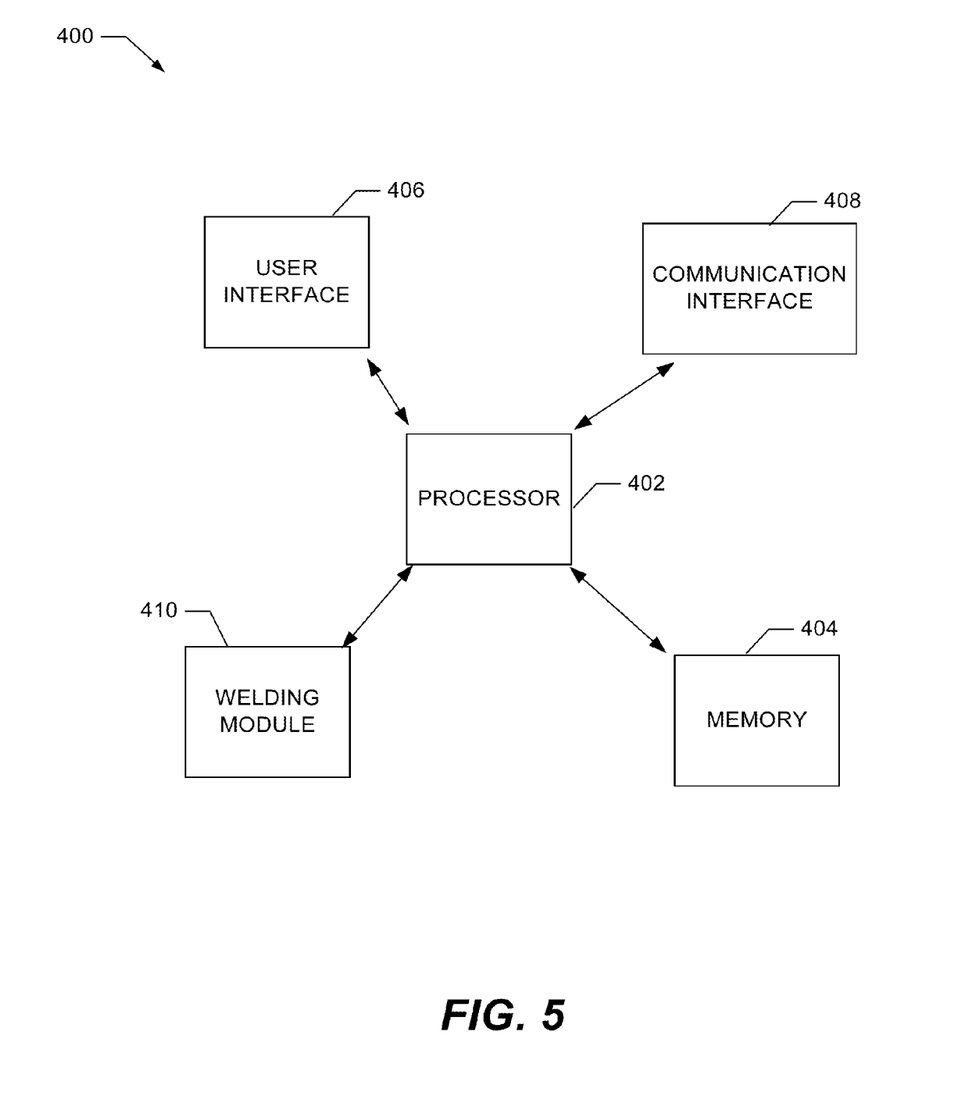
FIG. 5 illustrates a block diagram of an electronic device according to an example embodiment of the present disclosure.

FIG. 5 is a block diagram of an electronic device 400 suitable for use with the described embodiments. In one example embodiment the electronic device 400 may be embodied in or as the controller 228 for the thermal control device 226. In this regard, the electronic device 400 may be configured to control or execute the above-described preheating and/or cooling rate regulating operations.

The electronic device 400 illustrates circuitry of a representative computing device. The electronic device 400 may include a processor 402 that may be microprocessor or controller for controlling the overall operation of the electronic device 400. In one embodiment the processor 402 may be particularly configured to perform the functions described herein. The electronic device 400 may also include a memory device 404. The memory device 404 may include non-transitory and tangible memory that may be, for example, volatile and/or non-volatile memory. The memory device 404 may be configured to store information, data, files, applications, instructions or the like. For example, the memory device 404 could be configured to buffer input data for processing by the processor 402. Additionally or alternatively, the memory device 404 may be configured to store instructions for execution by the processor 402.

The electronic device 400 may also include a user interface 406 that allows a user of the electronic device 400 to interact with the electronic device. For example, the user interface 406 can take a variety of forms, such as a button, keypad, dial, touch screen, audio input interface, visual/image capture input interface, input in the form of sensor data, etc. Still further, the user interface 406 may be configured to output information to the user through a display, speaker, or other output device. A communication interface 408 may provide for transmitting and receiving data through, for example, a wired or wireless network such as a local area network (LAN), a metropolitan area network (MAN), and/or a wide area network (WAN), for example, the Internet.

The electronic device 400 may also include a welding module 410. The processor 402 may be embodied as, include or otherwise control the welding module 410. The welding module 410 may be configured for controlling or executing friction stir welding operations including, for example, preheating and/or cooling rate regulating operations as described herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling machining operations. In this regard, a computer readable storage medium, as used herein, refers to a non-transitory, physical storage medium (e.g., a volatile or non-volatile memory device, which can be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A friction stir welding method, comprising:
preheating a joint between a first part and a second part with a preheating device;
directing a friction stir welding tool along the joint between the first part and the second part to form a weld therebetween, the friction stir welding tool comprising the preheating device offset a first distance ahead of a rotating portion of the friction stir welding tool and a cooling regulating device disposed a second distance behind the rotating portion of the friction stir welding tool;
measuring a temperature of a welded portion of the joint proximate the cooling regulating device;
measuring a temperature of the joint at the rotating portion of the friction stir welding tool; and
adjusting a cooling rate of the welded portion of the joint based upon the measured temperatures to achieve a desired cooling rate with the cooling regulating device, the cooling regulating device configured to be in thermal contact with the welded portion of the joint,
wherein the preheating device preheats the joint while the friction stir welding tool is being directed along the joint.

2. The friction stir welding method of claim 1, wherein adjusting the cooling rate of the weld comprises selectively varying the cooling rate along a length of the weld.

3. The friction stir welding method of claim 1, wherein when the cooling rate is greater than a desired cooling rate, adjusting the cooling rate comprises heating a portion of the weld disposed proximate the cooling regulating device.

4. The friction stir welding method of claim 3, wherein when the cooling rate is less than a desired cooling rate, adjusting the cooling rate comprises cooling a portion of the weld disposed proximate the cooling regulating device.

5. A method for welding a first component to a second component, the method comprising:
welding together the first and second component by operating a friction stir welding tool along a welding path during a welding operation, the welding path defined along a surface at a junction between the first and second components; and
at the surface along which the friction stir welding tool is displaced,
measuring a cooling rate of the weld with a plurality of temperature sensors mechanically coupled with the friction stir welding tool, a select one of the plurality of temperature sensors being directly coupled to the friction stir welding tool by way of an arm that displaces the select one of the plurality of temperature sensors along with the friction stir welding tool during displacement of the friction stir welding tool, each one of the plurality of temperature sensors being configured to monitor a portion of the junction a fixed distance from the friction stir welding tool during the welding operation, and
adjusting the cooling rate of the weld using a temperature regulating device mechanically coupled with the friction stir welding tool by way of the arm and in electrical communication with the plurality of temperature sensors.

6. The method as recited in claim 5, wherein one of the monitored portions of the junction measuring the cooling rate further comprises measuring a temperature of the weld at the friction stir welding tool with a second temperature sensor disposed on the friction stir welding tool.

7. The method as recited in claim 5, wherein a portion of the temperature regulating device is in direct contact with the surface at a welded portion of the junction and wherein one of the plurality of temperature sensors is in contact with the surface at the welded portion of the junction proximate the temperature regulating device.

* * * * *